United States Patent
Prasse et al.

[11] 3,806,137
[45] Apr. 23, 1974

[54] RESILIENT PLASTIC PISTON RING

[75] Inventors: Herbert F. Prasse, Town & Country; Harold E. McCormick, Ballwin, both of Mo.

[73] Assignee: Ramsey Corporation, St. Louis, Mo.

[22] Filed: Apr. 19, 1971

[21] Appl. No.: 134,985

Related U.S. Application Data

[62] Division of Ser. No. 16,278, March 4, 1970, Pat. No. 3,608,911.

[52] U.S. Cl. ............................. 277/205, 277/165
[51] Int. Cl. ............................................. F16j 9/08
[58] Field of Search ........... 277/138, 139, 154, 165, 277/205, 195, 216, 9.5, 206.1, 206, 212; 92/195, 182, 254, 242

[56] References Cited
UNITED STATES PATENTS

| | | | |
|---|---|---|---|
| 3,036,874 | 5/1962 | Sharp | 92/242 |
| 3,104,883 | 9/1963 | English et al. | 277/212 |
| 3,519,280 | 7/1970 | Genz | 277/212 |
| 3,636,824 | 1/1972 | Clark | 277/212 |
| 2,686,092 | 8/1954 | Neesen | 277/212 |
| 3,601,415 | 8/1971 | Bond | 277/9.5 |
| 3,612,551 | 10/1971 | Grabill | 277/206 A |

FOREIGN PATENTS OR APPLICATIONS

| | | | |
|---|---|---|---|
| 684,902 | 4/1964 | Canada | 277/206 A |

Primary Examiner—Louis R. Prince
Assistant Examiner—Robert I. Smith
Attorney, Agent, or Firm—Hill, Sherman, Meroni, Gross & Simpson

[57] ABSTRACT

A plastic ring for internal combustion engine pistons. In a preferred embodiment, the ring has an outer diameter lip for engaging the cylinder wall, an inner diameter portion bottomed in the ring groove of the piston, and an axial groove intermediate the outer diameter lip and the inner diameter portion whereby combustion gases will act in the groove to expand the inner diameter into sealing contact with the bottom of the ring groove and expand the outer diameter lip into sealing engagement with the cylinder wall.

23 Claims, 14 Drawing Figures

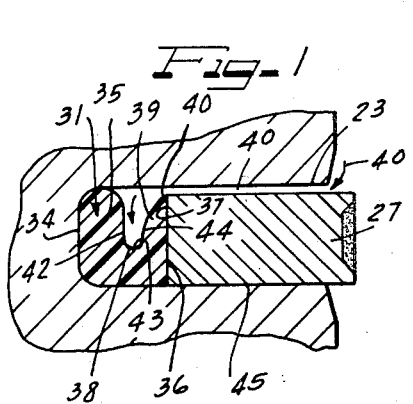
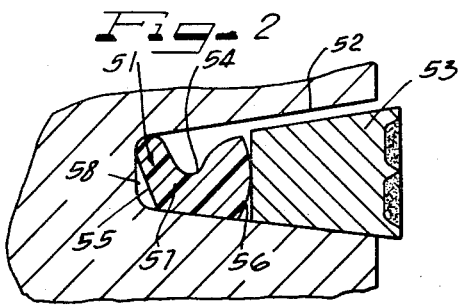
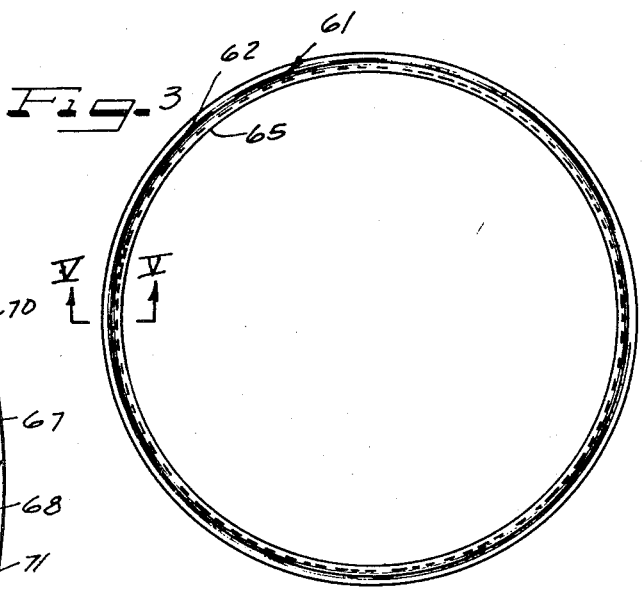
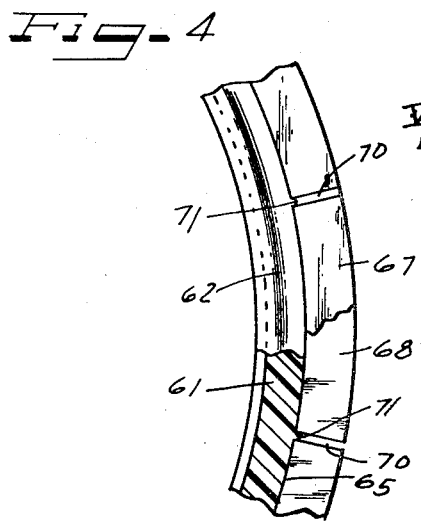
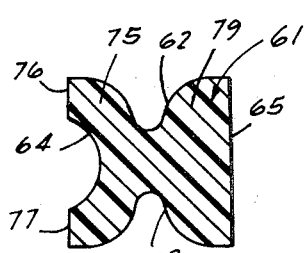
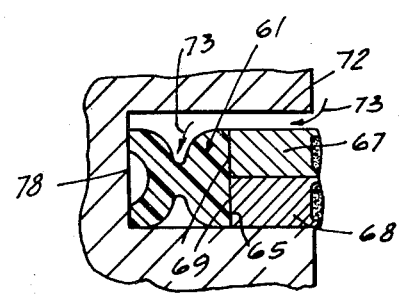

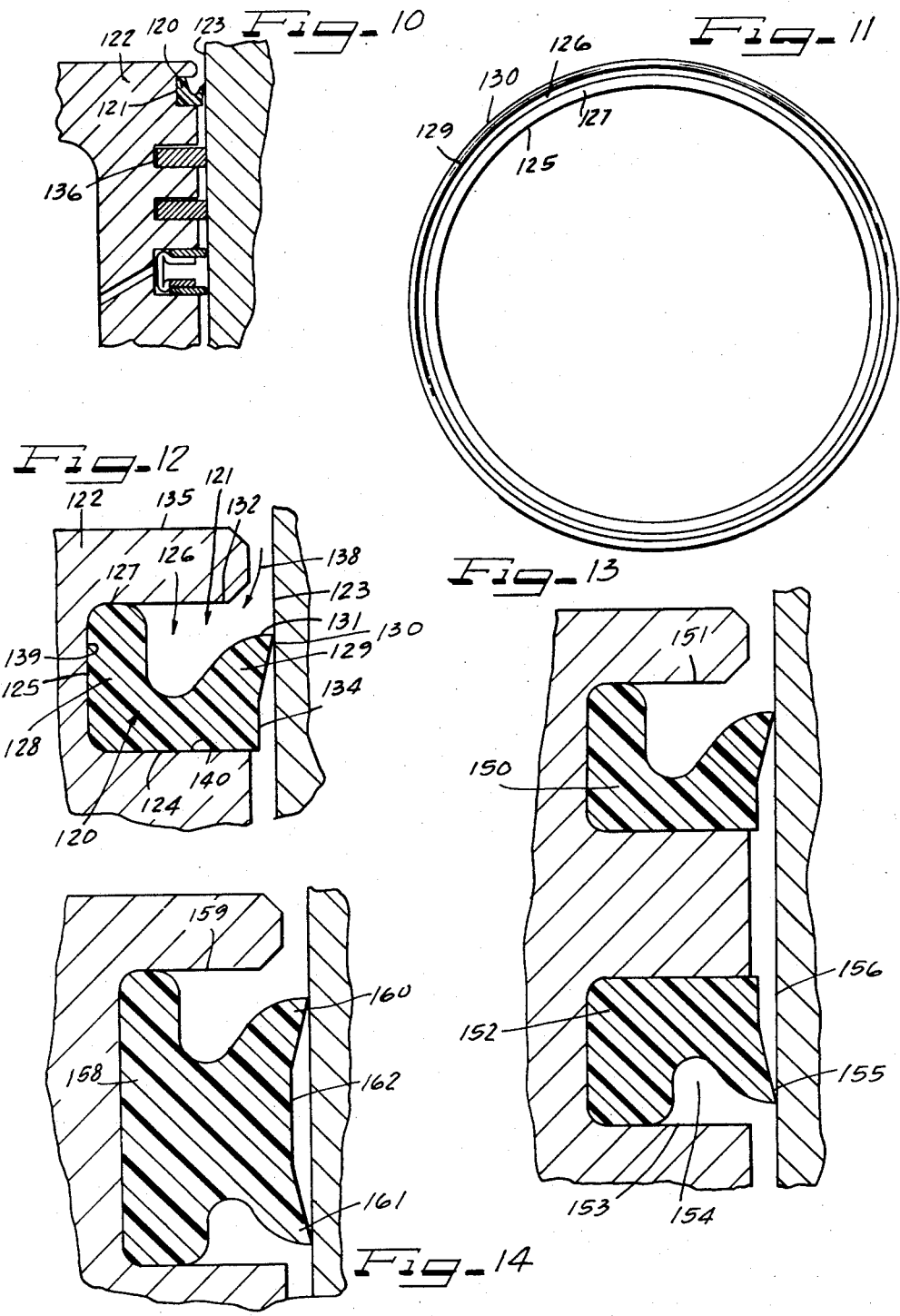

RESILIENT PLASTIC PISTON RING

CROSS-REFERENCE TO RELATED APPLICATIONS

This application is a division of our co-pending application Ser. No. 16,278, filed Mar. 4, 1970 and now U.S. Pat. No. 3,608,911.

BACKGROUND OF THE INVENTION

1. Field of the Invention

This invention relates to internal combustion engines and more particularly to a piston ring for use in such engines.

2. Prior Art

Recently, more emphasis has been placed upon controlling internal combustion engine emissions. It has been determined that a significant quantity of undesirable emissions as well as power loss are the result of combustion blowby. Such blowby occurs between the outer diameter of the piston and the cylinder wall. While compression rings, carried by the piston in ring grooves, have been used to seal this space, the prior art rings and ring sets do not completely seal the firing chamber.

It has been further suggested that the piston ring be made substantially L-shaped, as in the U.S. Pats. to R.S. Moore, No. 1,159,066 and Goetze, No. 2,844,424, with one leg of the L engaging the cylinder wall while the other leg is retained in the ring groove. In such constructions, the force of the entrapped combustion gases is used to expand, circumferentially, the first leg into tighter engagement with the cylinder wall. While such rings may be effective in reducing blowby between the ring and the cylinder wall, they are not effective in preventing the escape of such gas through the ring groove. Further, because such rings are historically of split annular construction, a considerable amount of gas can escape in the area of the ring gap.

SUMMARY OF THE INVENTION

Our invention overcomes the disadvantages of the prior art by providing a resilient plastic piston ring which utilizes the pressure of the entrapped gas. Because the ring relies upon the pressure of entrapped gas to provide the expansion force, friction is reduced during those portions of the engine cycle while either the pressure retained is reduced, as during exhaust, or where there is no pressure retained as during intake.

In a preferred embodiment, the ring is slightly U-shaped with one leg of the "U" being radially thinner and axially shorter than the other.

In the primary embodiment, the resilient plastic piston ring of this invention is used without a standard piston ring and has its outer diameter adapted to contact the cylinder wall. The ring is seated against the bottom of the ring groove and is preferably used in a groove immediately adjacent the top of the piston to control blowby or may be used in a lower groove, in an inverted position, to function as an oil control ring.

In yet another embodiment, the ring is bottomed in the ring groove and has a slanted outer diameter face adapted to engage the cylinder wall, a portion of the outer periphery extending below the normal ring groove depth in a secondary curved cutback groove.

In each instance the ring is preferably made of a high temperature resilient plastic such as Vespel (Reg. trademark of E. I. du Pont de Nemours & Co. for a polyimide resin), Teflon (Reg. trademark for a polytetrafluoroethylene manufactured by E. I. du Pont de Nemours & Co.), or one of the high-temperature aromatic polyimides. Although the ring is preferably a 360° continuous ring, specific materials may require the use of a split ring for specific applications.

In those instances where the plastic ring does not contact the wall of the combustion cylinder, in addition to the above-mentioned high temperature plastics, a high temperature fluoroelastomer may be used such as Viton (Reg. trademark of E.I. du Pont de Nemours & Co. for a fluoroelastomer).

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a fragmentary cross-sectional view of the piston ring of this invention illustrating the ring seated in a ring groove behind a standard compression piston ring.

FIG. 2 is a view similar to FIG. 1 illustrating a different ring used in connection with a keystone piston ring.

FIG. 3 is a top plan view of a modified piston ring of this invention.

FIG. 4 is a partially sectional side plan view of the FIG. 3 embodiment of the ring of this invention.

FIG. 5 is a cross-sectional view of the ring of FIG. 3, taken along the line V—V.

FIG. 6 is a fragmentary cross-sectional view of the ring of FIGS. 3, 4 and 5 received in a piston ring groove and used as an expansion ring for a pair of standard composition piston rings.

FIG. 10 is a fragmentary cross-sectional view of the ring area of a piston received in a cylinder, illustrating one embodiment of the continuous ring of this invention utilized for blowby control.

FIG. 11 is a top plan view of the ring illustrated in FIG. 10.

FIG. 12 is a fragmentary enlarged cross-sectional view of the top ring groove of FIG. 10, illustrating the ring.

FIG. 13 is a fragmentary cross-sectional view of the ring grooves of a modified piston illustrated as received in a cylinder wall and showing other combination uses for the ring of this invention.

FIG. 14 is a fragmentary cross-sectional view of a ring groove of a modified piston received in the cylinder, illustrating another embodiment of this invention.

DESCRIPTION OF THE PREFERRED EMBODIMENTS

Figure 8:
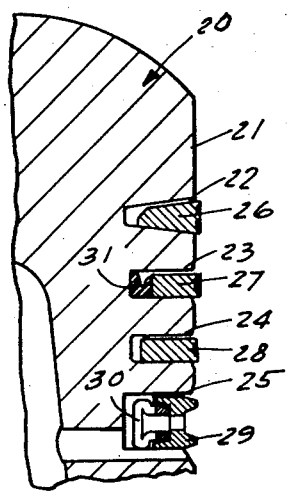
FIG. 8 is a view similar to FIG. 7, illustrating the ring of FIG. 1 as received in a piston.

FIG. 8 fragmentarily illustrates a piston 20 of the type such as is used in internal combustion engines, especially diesel engines and the like. The piston 20 has a head portion 21 equipped with a plurality of circumferential grooves 22, 23, 24 and 25. The grooves receive piston rings which project outwardly therefrom to provide a seal between the piston and the cylinder in which the piston is received. The rings may be of the compression type such as the rings 26, 27, and 28 or may be oil control rings such as the ring 29.

In the view illustrated, the ring 26 is illustrated as being a torsion twist keystone ring received in a wedge-shaped groove, the ring 27 is illustrated as being a conventional rectangular compression ring with a coated wear face received in a rectangular groove 23, and the ring 28 is illustrated as being a bevelled faced compression ring with a wear coated face also received in a rectangular groove 24. The oil control ring 29 illustrated is a one-piece U-shaped ring expanded by a circumferentially expanding spring 30.

Although many advances have been made in the design of piston rings, with the increasing use of high-performance engines and the increasing combustion pressures encountered therein, conventional piston rings still allow a significant amount of the combustion gases to escape from the combustion area by traversing the path between the piston head and cylinder wall. Some of this escapage occurs between the outer diameter of the rings and the cylinder wall. A large amountalso occurs by passage of gas around the piston ring in the ring groove. It is the purpose of this invention to minimize such gas blowby.

In order to effectuate this purpose, in the embodiment illustrated in FIG. 8, a plastic piston ring 31, according to this invention, is placed in a ring groove behind the conventional piston ring. The ring 31 is illustrated as being placed in the ring groove 23 behind the compression ring 27.

FIG. 1 is an enlarged fragmentary view of the ring groove 23 and rings 27 and 31. In accordance with the customary practice, the groove is axially taller and radially deeper than the conventional piston ring 27 so that the ring may be movable therein.

The ring 31 is positioned radially inwardly of the ring 27, and is preferably bottomed against the back wall 34 of the groove 23. The radially inner portion 35 of the ring preferably has an axial height approximately the same as the axial height of the groove 23. The front or outer diameter face 36 of the ring rides against the inner diameter 37 of the ring 27 and has an axial height less than the axial height of the inner diameter portion 35. An axially extending groove 38 projects into the ring between the radially outer portion 39 and the radially inner portion 35 with the inner portion being slightly thicker in a radial direction than the outer portion.

The groove 38 tapers axially upward and radially outward to a point 40 either at or in close spaced relation to the radially outer face 36. It is to be understood that although the ring 31 is illustrated as having its radially inner portion 35 thicker than the radially outer portion 39, the two being separated by the groove 38, that this is a matter of design and that in specific embodiments the thicknesses may be varied. Further, it is to be understood that the dimensions of the ring 31 are set so that it may be inserted into the ring groove behind the compression ring 27 in such a manner tat it will not adversely affect correct installation of the ring 27. It will further be understood that the ring 31 may be assembled with a clearance relationship between its inner diameter and the back wall of the groove or between its outer diameter and the back of the ring 27 so as to allow the ring 27 to be compressed when inserted into the cylinder. In this manner, the normal circumferential expansion force of the ring 27 against the cylinder wall is preserved.

The ring 31 is constructed of a high-temperature plastic and preferably of plastics such as the polyimides which are relatively stable at the temperatures encountered in an internal combustion engine. An acceptable plastic for use in constructing the ring 31 is known as Vespel, a registered trademark of the du Pont corporation. Such plastics are capable of continuous operation at temperature of up to 500°F. and intermittent temperature exposures up to 900°F.

The ring is preferably constructed of material which has an elastic memory so that the ring may be constructed as a continuous 360° ring. When so constructed, the ring is stretched to be fittable over the piston head and thereafter shrunk to its normal diameter within the ring groove. In lower ring groove applications, plastic materials such as Teflon (a registered trademark of the E. I. du Pont de Nemours & Co.) may be utilized. Where the elastic memory of the material is such as to be undesirable for the stretching and shrink fit insertion into the ring groove, the ring may be split to facilitate installation. It is to be understood that although different materials may be used, the preferred material is a material such as Vespel or Viton. Viton is a fluoroelastomer which in commercial embodiments such as Viton A or Viton B exhibits the desired properties of high temperature stability and flexibility. Further, the material must be resilient at the operating temperatures encountered in the ring groove and should have self-lubricating properties.

In the absence of pressure acting on the ring 31, the ring exerts little circumferential expansion force against the compression ring 27. However, during combustion, high-pressure gases flow into the ring groove 23 as illustrated by the arrows 40. The high-pressure gas will flow into the groove 38 where it will act equally against the radially inner wall 42 of the groove, the radially outer wall 44 of the groove and the bight 43 of the groove. This action will cause an expansion of the resilient material ring by increasing the radial depth of the groove. In this manner, the radially inner portion 35 will be pressed into tighter engagement with the bottom of the ring groove to prevent escape of compression gas around the inner diameter of the ring 31. The action of the gas against the bight portion 43 of the groove will force the ring 31 into tighter sealing engagement with the bottom wall 45 of the ring groove, thereby aiding in preventing flow of the compression gas around the ring 31. The pressure of the gas against the outer diameter wall 44 of the groove will act to force the outer diameter wall 36 of the ring 31 against the inner diameter wall 37 of the compression ring 27. This will create a circumferential expansion force against the compression ring 27 to increase the sealing pressure between the compression ring and the cylinder wall. This pressure also increases the sealing pressure between the outer diameter wall 36 of the ring 31 and the inner diameter wall 37 of the ring 27, thereby preventing flow of gas between the two rings.

It can therefore be seen that the compression gases will be effectively trapped within the ring groove in such a manner that leakage paths within the groove are blocked by a sealing force which is proportionate to the pressure of the gas. This will reduce or eliminate blowby through the ring groove while at the same time reducing blowby between the compression ring face and the cylinder wall by increasing the expansive force of the compression ring against the cylinder wall in direct response to the increase of compression gas pressure. Because the ring 31 is resilient, it is able to accommodate the radial expansion caused by relative movement between the radially inner portion 35 and the radially outer portion 39. Further, due to its resiliency, when the pressure of the compression gases is reduced, as during the intake cycle of a four-cycle engine, the ring 31 will resume its initial shape reducing circumferential force against the compression ring 27 and thereby lessening friction between the compression ring 27 and the cylinder wall.

FIG. 2 illustrates another embodiment of the ring 31. The ring 51 illustrated in FIG. 2 is shown fitted into a wedge-shaped groove 52 which receives a keystone ring 53. The ring 51 has a central axial groove 54 extending into the ring from the top thereof. The radially inner wall 55 of the ring 51 is angled axially upward and radially inward to provide a sloping back face. The radially outer diameter face 56 of the ring is axially convexly curved to give the ring a barrel face countour. The combination of the slanting back face 55 and the curved barrel face 56 allows the ring 51 to effectively seal the ring groove 52 with minimal normal contact between the ring 51 and the walls of the ring groove and the inner diameter of the compression ring. Further, due to the resiliency of the material of the ring 51 and the slanting inner diameter face 55 and barrel-shaped outer diameter face 56, the ring does not exert as large a circumferential expansion force as does the ring illustrated in FIG. 1. Further, some of the force of the compression gases may be utilized in deforming the inner peripheral portion 57 of the ring 51, thereby reducing the space 58 between the slanted face 55 and the bottom of the ring groove.

FIGS. 3 through 6 illustrate another embodiment of the plastic piston ring of this invention. The ring 61 has both top 62 and bottom 63 axial grooves. There is also an inner diameter groove 64 extending radially into the ring from the back thereof. The outer diameter face 65 is axially straight and is designed to mate with the inner diameter of a conventional compression ring or rings.

Conventional piston rings have a radial gap therein to allow insertion into the piston ring groove. Such gaps provide an escape path for combustion gases. In order to close this gap, it has been suggested to place two axially thin compression piston rings in a single ring groove with their gaps circumferentially spaced from one another. However, during operation of the piston, the piston rings may move independently of one another and their gaps thereafter become aligned. When this occurs, the compression gases may escape axially through the aligned gaps.

The plastic piston ring 61 retains the circumferential misalignment of such rings. As illustrated in FIG. 6, the ring 61 is placed radially inwardly of two conventional compression rings 67 and 68. The radially outer face 65 of the ring 61 abuts the inner diameter faces 69 of the compression rings 67 and 68. Because the ring 61 is made of a plastic material, portions of its outer diameter face 65 will extrude into the gaps 70 as illustrated in FIG. 3. The extrusion points 71 will lock the ring gaps 70 in circumferential misalignment and thereafter the piston rings 67 and 68 and the ring 61 will move in the groove 72 as a unit.

The ring 61 further acts to prevent compression gas blowby through the ring groove 72. As high pressure gas enters the ring groove 72, as illustrated by the arrow 73, it will be trapped in the upper portion of the groove 72 by the ring 61. As the high pressure gases contact the ring, they will enter the groove 62 acting against the radially inner portion 75 to force the inner diameter walls 76 and 77 against the back wall 78 of the ring groove. At the same time, they will increase the circumferential expansion force of the outer diameter wall 65 against the inner diameters 69 of the rings 67 and 68. Due to the provision of the three grooves 62, 63 and 64, the ring 61 is slightly compressible in both an axially downward and radially inward direction. Further, the presence of high-pressure gas in the groove 62 will force apart the radially inner portion 75 and the radially outer portion 79 of the ring 61 thereby creating both the sealing force against the back wall 79 and the expansion force against the compression rings 67 and 68. In this manner, the gas will be trapped in the ring groove. An additional feature is provided by grooving both the top and the bottom axial ends of the ring 61 in that the ring may be inserted in the ring groove with either of the grooves 62 or 63 on the top.

Figure 7:
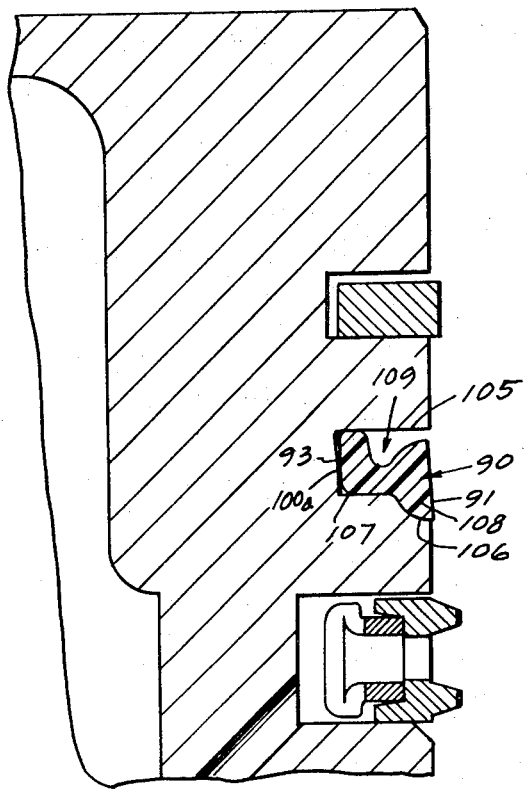
FIG. 7 is a fragmentary cross-sectional view of a piston equipped with one of the embodiments of the ring of this invention.
Figure 9:
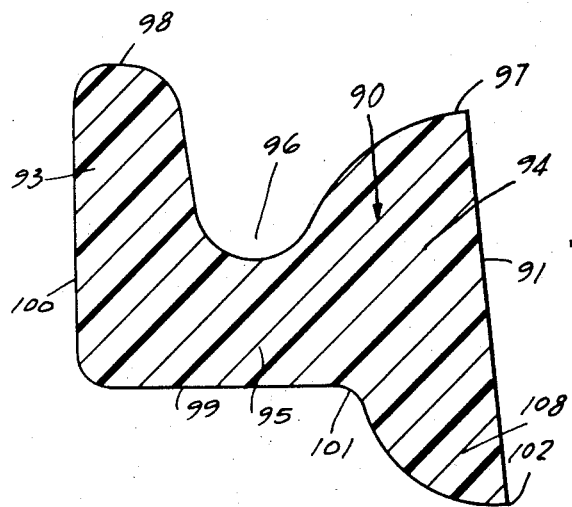
FIG. 9 is a cross-sectional view of the embodiment illustrated in FIG. 7.

FIGS. 7 and 9 illustrate another modification of the ring of this invention which is inserted in an especially cut ring groove. The ring 90 has an outer diameter face 91 adapted to contact the cylinder bore wall, thereby providing an oil scraping lip.

The ring has a radially inner axially extending portion 93 which is integral with a radially outer portion 94 through the radially extending bottom portion 95. A groove 96 extending into the ring from the top thereof separates the inner portion 93 from the outer portion 94. The top 97 of the radially outer portion at the front face 91 is below the top 98 of the radially inner portion and the axial top surface of the radially outer portion 94 has an arcuate slope from the point 97 to the groove 96. The bottom 99 of the ring 90 extends radially outward from the back wall 100 to a point 101 beyond the groove 96. Thereafter, the bottom tapers arcuately axially downward and outward to the front face 91 so that the bottom portion of the radially outermost portion 94 extends axially beyond and below the remainder of the ring. The scraping face 91 is tapered radially inward from the bottom 102 to the top 97 thereof.

The piston groove 105 is a rectangular groove having a height slightly greater than the height of the radially inner portion 93 of the ring 90. A secondary stacked portion 106 of the groove 105 receives the axially extended bottom portion of the radially outer portion 94. The portion 106 of the groove is arcuately cut from the bottom 107 of the rectangular groove at the outer diameter thereof. The portion 106 is cut radially into the piston a distance slightly less than the thickness of the lip portion 108 of the ring formed by the bottom of the radially outer portion 94. In this manner, the portion 108 projects out of the ring groove to a point where it may contact the cylinder wall.

The back wall 100 of the ring 90 preferably bottoms against the back wall 100a of the ring groove 105 in a manner substantially the same as the ring 31 of FIG. 8.

When high pressure compression gases flow into the ring groove 105 as illustrated by the arrow 109, they will encounter the groove 96 where they will act to expand the radially outer portion 94 of the ring 90. This will press the face 91 against the cylinder wall. The taper of the face 91 allows the axially upper portion of the ring to be expanded against the cylinder wall when high-pressure gases are present in the groove 96. The pressure of the compression gases will also act in the groove 96 of the ring 90 to radially expand the same whereby the back wall 100 of the ring 90 will be forced into sealing engagement with the back wall 100a of the ring groove 105. The contact between the cylinder wall and the axially lower portion of the scraping face 91 allows the ring to function as an oil scraping ring. The presence of high pressure gases in the groove 96 will increase the contact pressure between the face 91 of the ring 90 and the cylinder wall. As the pressure in the groove 96 increases, the portion of the front face 91 of the ring 90 contacting the cylinder wall will increase as the ring 90 is circumferentially expanded. In this manner the ring 90 functions as an anti-blowby ring in that it seals escape path through the ring groove 105 by contact with the axial end walls of the ring groove 105 and by sealing engagement with the back wall 100a of the groove. Further blowby between the piston head and the cylinder wall is minimized due to the expansion pressure contact between the outer diameter face 91 of the ring 90 and the cylinder wall. In order to aid in effectuating this seal, the ring groove 105 is preferably equal to or just slightly greater than the height of the inner diameter portion 93 of the ring groove 90 so that the top 98 thereof may contact the axial end of the ring groove in response to the pressure of gases in the groove 96 when the back wall 100 of the ring 90 is bottomed against the back wall 100a of the ring groove.

FIGS. 10 through 13 illustrate another embodiment of the plastic piston ring of this invention. FIG. 10 illustrates the ring 120 received in a special top ring groove 121 in a piston 122. A portion of the ring rides against the cylinder wall 123.

The ring 120 is an annular continuous plastic piston ring having a flat bottom or axial end 124 and a straight axially extending back wall 125. An axially extending groove 126 projects into the ring from the top 127 thereof, dividing the ring into a radially inner portion 128 and a radially outer portion 129. The radially outer portion 129 terminates at its outer diameter with a cylinder wall engaging portion 130. The axial top end 131 of the radially outer portion 129 is below the top 127 of the radially inner portion 128 and is spaced from the top side wall 132 of the piston groove 121. The axial height of the ring 120 at the radially inner portion is approximately the same as the height of the groove. In this manner, the upper portion of the radially outer portion serves as a sealing lip with the bottom axial portion thereof cut back as at 134 to a reduced diameter portion so that the cylinder engaging portion 130 projects radially beyond the remainder of the ring.

The groove 121 is in close spaced relation to the top 135 of the piston 122 and is located above the normal position of the top ring groove 136 of a standard piston. The ring 120 serves as an anti-blowby ring reducing harmful exhaust emissions as well as preventing entrance of uncombusted fuel and oxygen mixtures into the space between the cylinder wall 123 and the piston 122 where they would normally not be combusted due to the smallness of the area.

In addition, the ring acts in the same manner as previously described rings. As high pressure combustion gases force their way between the top of the piston and the cylinder wall, they are entrapped in the groove 126 as indicated by the arrow 138. Their effect upon the groove will be to force the inner diameter portion 128 tightly against the back 139 of the piston groove and to force the bottom wall 124 of the ring against the bottom wall 140 of the groove, thereby preventing escape of gases around the ring in the groove. Further, they will force the cylinder wall engaging portion 130 of the outer diameter portion 129 tighter against the cylinder wall 123 thereby cutting off flow of the outer diameter. In the absence of high pressure gases in the groove 126, the contact between the ring and the cylinder wall will be less thereby reducing friction. Therefore, contact between the cylinder wiping portion 130 and the cylinder wall 123 will be greatest during the power and compression strokes and smallest during the intake stroke. During the exhaust stroke, there will be a slight expansion effect on the ring.

FIG. 13 illustrates a dual ring, dual groove arrangement where one of the rings 150 identical to the ring 120 is inserted in a top groove 151 identical to the groove 121. A secondary ring 152 which may be identical to the rings 150 and 120, or which may be as illustrated having a shallower groove 154, is inserted in a lower ring groove 153. This ring acts as an oil control ring with the cylinder engaging lip 155 acting against the cylinder wall 156 to wipe excess oil therefrom and to prevent excess amounts of oil from being forced upwardly to the upper reaches of the cylinder where they could be combusted to form hydrocarbon deposits on the cylinder wall.

FIG. 14 illustrates a single ring 158 received in a wider top piston ring groove 159. The single ring 158 functions as a combination of the rings 150 and 152 and has two axially spaced cylinder engaging lips 160 and 161 separated by a reduced diameter portion 162 which does not normally contact the cylinder wall. In this embodiment, the lower lip 161 functions as an oil control lip while the upper lip 160 functions in the manner of the cylinder engaging portion 130 of the ring 120.

It can therefore be seen from the above that our invention provides an improved plastic piston ring which reduces the exhaustion of harmful internal combustion engine emission products by reducing gas blowby between the piston and the wall of the cylinder in which the piston operates. The ring can directly engage the cylinder wall with a given standard pressure and in the presence of high-pressure gases will contact the cylinder wall with a greater pressure while at the same time sealing the groove in which it is received to prevent internal groove blowby.

Although the teachings of our invention have herein been discussed with reference to specific theories and embodiments, it is to be understood that these are by way of illustration only and that others may wish to utilize my invention in different designs or applications.

We claim as our invention:

1. A plastic piston ring for use in sealing an internal combustion engine piston and cylinder against blow-by from the firing chamber, comprising:

a plastic ring having radially inner and radially outer axially extending and thick solid portions commonly connected to a central portion;

at least one axially directed groove in the central portion separating said radially inner and radially outer portions;

the axial thickness of said connecting portion being about one-half or less of the maximum axial width of the ring;

said radially outer portion being radially outwardly movable with respect to the radially inner portion in response to the presence of high-pressure gases in the groove;

and said outer portion having a convexly curved shoulder extending from its free end into the bottom of said groove whereby to facilitate high-pressure gas flow thereover into said groove;

said shoulder providing said outer portion with progressively increasing thickness from said free end into said groove.

2. The piston ring of claim 1 wherein the said ring is a 360° continuous ring.

3. The piston ring of claim 2 wherein the material of the said piston ring is a high temperature polyimide.

4. The plastic piston ring of claim 1 wherein the said ring is a 360° continuous ring constructed of a high temperature polyimide resin.

5. A plastic piston ring according to claim 1, wherein the material of said ring is a fluoroelastomer of high temperature stability and flexibility.

6. A plastic piston ring according to claim 1, wherein said radially inner portion has a substantially straight surface leading into said groove joining the free end of said radially inner portion on a convex contour.

7. A plastic piston ring according to claim 1, wherein the outer diameter of the piston ring is axially curved.

8. A plastic piston ring according to claim 1, including a second axially directed groove opening in the opposite direction from said first mentioned axially directed groove, and an annular radially inwardly opening groove in the inner diameter of the ring.

9. A plastic piston ring according to claim 1, wherein said groove is located closer to the outer diameter than the inner diameter of the ring, whereby said radially outer portion is radially thinner than said radially inner portion.

10. A plastic piston ring for use in internal combustion engines comprising: a 360° continuous plastic ring having inner and outer diameters and top and bottom axial ends, a radial groove extending into said ring from the inner diameter thereof intermediate the top and bottom axial ends, an axial groove extending into said ring from the top axial end thereof intermediate the inner and outer diameters, a second axial groove extending into said ring from the bottom axial end thereof intermediate the inner and outer diameters, said radial groove and said axial grooves terminating in spaced relationship to one another the outer diameter of the plastic piston ring being cylindrical and axially continuous.

11. The ring of claim 10 wherein the material of the said ring is a high temperature polyimide resin.

12. The piston ring of claim 10, wherein the material of the said ring is a fluoroelastomer of high temperature stability and flexibility.

13. A plastic piston ring for use in internal combustion engines comprising: a ring of resilient plastic material having inner and outer diameters and an axial thickness, an axially extending groove projecting into said ring from the axial end thereof intermediate the inner and outer diameters, the said groove dividing the said ring into radially inner and radially outer portions integrally connected through a central portion at the bottom of the groove, one axial end of the said radially inner portion adjacent the said groove extending axially beyond the corresponding end of the radially outer portion, the other axial end of the radially outer portion extending beyond the corresponding end of the radially inner portion.

14. The ring of claim 13, wherein the said plastic piston ring is a 360° continuous ring.

15. A plastic piston ring comprising a substantially H-shaped cross section plastic piston ring, the inner diameter leg of said H-shaped cross-section piston ring being a solid flat continuous axially extending wall and extending axially beyond the outer diameter leg of both axial ends, the outer diameter leg of said H-shaped cross section plastic piston ring having axial end portions projecting radially beyond the center portion, the said plastic piston ring being resilient whereby pressure in either of the spaces between the legs of the H-shaped cross section piston ring greater than the pressure to either radial side of the piston ring will circumferentially expand portions of the ring, the axial central portion of the ring being continuous from the inner diameter to the axial center of the outer diameter, the axial center of the outer diameter being radially recessed from the outer diameter at the axial ends to provide seal lips at the axial ends while being closely spaced to the outer diameter at the axial ends thereof to prevent axial collapse of the ring at the outer diameter.

16. A plastic piston ring for use in internal combustion engines comprising: a 360° continuous plastic piston ring, said ring having an axially extending groove projecting thereinto from an axial end thereof intermediate the inner and outer diameters thereof separating the said ring into inner and outer radial portions integrally connected through a central portion, the radially inner portion having an axial end extending beyond the corresponding axial end of the radially outer portion, another axial end of the radially outer portion extending axially beyond the corresponding axial end of the radially inner portion, the groove projecting into the ring from the axial end having the axial end of the radially inner portion projecting beyond the corresponding axial end of the axially outer portion.

17. A plastic piston ring for use in sealing an internal combustion engine piston and cylinder against blow-by from the firing chamber, comprising:

a plastic ring having radially inner and radially outer axially extending and thick solid portions commonly connected to a central portion;

at least one axially directed groove in the central portion separating said radially inner and radially outer portions;

at least one of said portions being radially movable relative to the other of said port ions; and the outer diameter of said ring having an annular surface which is convexly axially curved.

18. A piston ring according to claim 17, wherein the inner diameter of said ring is axially tapered.

19. A plastic piston ring for use in sealing an internal combustion engine piston and cylinder against blow-by from the firing chamber, comprising:
an annular ring of plastic material having an axial-radial thickness and divided into two radial sections by an axially extending groove opening from one axial end of the ring and separated from the opposite axial end of the ring by an intermediate spacing portion of the ring;
said groove being placed closer to the outer diameter than to the inner diameter of the ring;
a portion of the outer diameter section of the ring adjacent to the groove being movable with respect to a portion of the inner diameter section in dependant response to the presence of high-pressure gas in the groove;
and said outer diameter section having a radially projecting lip at its free axial end with the radially outer side of the lip having an oblique surface joining a generally axially extending surface on the outer diameter of the ring defining a cutback relative to said lip.

20. A plastic piston ring according to claim 19, said radially outer radial section of the ring having on its radially inner side a convex shoulder extending from the free end tip thereof to the bottom of said groove.

21. A plastic piston ring according to claim 20, wherein the bottom of said groove is on a radially extending concave contour joining a generally axially extending radially inner surface on the radially inner section of the ring.

22. A plastic piston ring according to claim 19, having a second annular groove on the opposite side of said intermediate portion from the first mentioned groove, whereby the ring has radially inner and radially outer spaced sections on both axial ends of the ring, both of the radially outer sections having generally the same shape with an oblique radially outer annular surface joining said generally axially extending surface on the outer diameter of the ring.

23. A plastic piston ring according to claim 19, wherein said radially outer section has a radially inner surface inwardly tapering into said groove, said groove having a concave radially extending contour, and said radially inner section of the ring having a generally axially extending surface joining said concave surface of the groove

* * * * *